May 27, 1952 W. A. STEINER ET AL 2,597,907
APPARATUS FOR THE SEPARATION OF GASES BY
FRACTIONAL PERMEATION THROUGH MEMBRANES
Filed March 31, 1950 6 Sheets-Sheet 1

INVENTORS
Waldo A. Steiner
Sol W. Weller
BY
ATTORNEY

INVENTORS
Waldo A. Steiner
Sol W. Weller
BY
ATTORNEY

May 27, 1952    W. A. STEINER ET AL    2,597,907
APPARATUS FOR THE SEPARATION OF GASES BY
FRACTIONAL PERMEATION THROUGH MEMBRANES
Filed March 31, 1950            6 Sheets-Sheet 5

INVENTORS
Waldo A. Steiner
Sol W. Weller
BY
ATTORNEY

INVENTORS
Waldo A. Steiner
Sol W. Weller
BY
ATTORNEY

Patented May 27, 1952

2,597,907

UNITED STATES PATENT OFFICE 2,597,907

APPARATUS FOR THE SEPARATION OF GASES BY FRACTIONAL PERMEATION THROUGH MEMBRANES

Waldo A. Steiner and Sol W. Weller,
Pittsburgh, Pa.

Application March 31, 1950, Serial No. 153,264

10 Claims. (Cl. 183—2)

(Granted under the act of March 3, 1883, as
amended April 30, 1928; 370 O. G. 757)

The invention herein described and claimed may be manufactured and used by or for the Government of the United States of America for governmental purposes without the payment of royalties thereon or therefor.

This invention relates to a process and apparatus for the separation of gases by the fractional permeation of gaseous mixture through thin, non-porous membranes.

It has been known for some time that gases may be separated from one another by allowing a gaseous mixture to fractionally permeate through a thin, non-porous membrane which is selectively permeable to one of the gaseous components. One of the earliest examples of such a process is the separation of oxygen from atmospheric air by the fractional permeation of air through rubber membranes. By bringing air into contact with one side of a rubber membrane and allowing a fraction of the air to permeate therethrough, an oxygen-enriched gas can be recovered on the other side of the membrane.

In processes of this type it is necessary that the membranes employed be non-porous, that is, free from pin holes and other defects destroying their continuity. The separation which may be achieved depends upon the gases permeating through the body of the membrane rather than diffusing through pores present therein. The selectivity of a given membrane towards a given gas (as measured by the difference in the rate of permeation of the given gas as compared to the rates of permeation of other gases with which it may be mixed) probably depends upon the difference in solubility of the gases comprising the mixture in the material of which the membrane is composed, and upon the difference in the rates of diffusion of the dissolved gases through the membrane. The selectivity of a membrane is almost completely destroyed by the presence of discontinuities large enough to allow gases to leak, rather than permeate through it.

Some membranes have a selectivity toward a given gas which is quite high. For example, polystyrene is more selective to hydrogen than to methane by a factor of about 20:1. However, due to the fact that the gases must permeate through the membrane by a process probably involving solution of the gases in the membrane, the total rate of permeation in processes of this type (as measured by the total volume of gas permeating per unit time) is quite slow. In order to improve the total rate of permeation, thin membranes must be used since the total rate of permeation is inversely proportional to the thickness of the membrane. Membranes of a minimum thickness which may be prepared free from pin holes or other discontinuities, which have sufficient mechanical stability to withstand handling during installation, and which will not rupture under conditions of use, should be employed. Likewise, since the total rate of permeation of gases through non-porous membranes is directly proportional to the pressure differential existing on opposite sides of the membranes, it follows that a pressure differential should be maintained as large as possible consistent with the resistance of the membranes to rupture and with the cost of compressing the gases.

However, even with the use of a thin membrane and a relatively high pressure differential on opposite sides of the membrane, the membrane area necessary for handling gaseous mixtures in commercial quantities is nevertheless very large. The economic feasibility of a large scale gas separation process employing selectively permeable non-porous membranes depends largely upon the provision of means for arranging the large membrane area required in compact units having a minimum volume and requiring a minimum amount of materials. The membrane supporting unit must in particular have simple, inexpensive, but effective means for supporting the low pressure sides over substantially their entire area, since the membranes employed are thin and relatively fragile.

With these considerations in mind, it is an object of the invention to provide a process and apparatus for the separation of gases by fractional permeation of gaseous mixtures through non-porous membranes by virtue of which large areas of membrane may be disposed in compact units of minimum volume requiring a minimum amount of materials.

It is a further and particularly important object of the invention to provide a process and apparatus for the separation of gases by a method involving the use of thin, non-porous membranes which affords a simple, but extremely effective means for supporting the low pressure sides of the membranes in order that they might be able to withstand relatively large pressures without danger of rupture.

These and other objects of the invention are, in general, accomplished according to the invention by providing a series of side-by-side adjacent chambers separated from one another by thin, non-porous membranes having the desired properties of selective permeability. The gaseous mixture to be separated is conducted through alternate chambers of this series and a portion of the gaseous mixture is allowed to permeate through the membranes into the intervening chambers. Since only part of the gas conducted into the alternate chambers is allowed to permeate, means are provided for withdrawing a portion of the gaseous mixture from the alternate chambers.

The intervening chambers are maintained under a pressure lower than the pressure in the alternate chambers. Preferably the alternate chambers are maintained at superatmospheric pressure while the intervening chambers are maintained at some lower pressure. In order to prevent the collapse of the membranes defining opposite walls of the intervening chambers due to the higher pressure existing in the alternate chambers, means comprising a porous sheet adapted to permit the passage of gas therethrough in directions parallel to its surface is disposed in each of the intervening chambers between, and in face adjacency with, the membranes defining the opposite walls of the intervening chambers. Preferably this porous sheet is comprised of a relatively thin sheet of fibrous material similar, for example, to a sheet of blotting paper. The pressure in the alternate chambers forces the membranes defining opposite walls of the intervening chambers into face-to-face contact with the porous sheet. Gases permeating through the membranes from the alternate chambers diffuse into these porous sheets and travel therethrough in directions parallel to their surfaces and are finally withdrawn therefrom by suitable outlet means associated with the intervening chambers.

In order to support the peripheral portions of the membranes, and to seal the periphery of the chambers defined by the membranes, a series of frames are provided disposed to face-to-face relationship, clamping between them the peripheral portions of the membranes. According to the preferred embodiment of the invention, the peripheral portions of a pair of membranes are clamped between each pair of adjacent frames. In this way a series of adjacent, side-by-side chambers are formed, alternate chambers being formed by pairs of adjacent membranes the peripheral portions of which are separated by one of the frames, and the intervening chambers being formed by pairs of adjacent membranes the peripheral portions of which are sealed together between a pair of adjacent frames. The frames are perferably relatively thin so that the membranes are relatively closely spaced, thus providing for the disposition of a maximum membrane area in a minimum volume. The intervening chambers are provided with a flat porous sheet which is gas conducting in directions parallel to its surface which spaces apart the membranes defining the intervening chambers, preventing them from being collapsed against one another due to the pressure existing in the alternate chambers. Means are provided, comprising a series of passages in the frames for admitting a gas under pressure into the alternate chambers. Means comprising a series of passages are likewise provided in the frames for withdrawing a portion of this gaseous mixture from the alternate chambers. In order to withdraw from the intervening chambers the gases permeating through the membranes from the alternate chambers, means are provided comprising a series of collectors, one of which is disposed in each intervening chamber. Each collector has passages communicating with an intervening chamber and the collectors are together provided with a common passage for collecting the permeated gases from the separate passages.

According to another embodiment of the invention, a plurality of generally similar frames are provided disposed in face-to-face relationship. In this embodiment, the peripheral portions of a single membrane are clamped between each pair of adjacent frames. In this way, a series of adjacent chambers are defined, each chamber being defined by a pair of membranes the peripheral portions of which are separated by one of the frames. The alternate chambers are supplied with the gaseous mixture to be separated, preferably under superatmospheric pressure, while the intervening chambers are maintained under a smaller pressure and receive gases permeating through the membranes from the alternate chambers. A porous sheet, similar in all respects to those described above, is disposed in each intervening chamber, thus preventing collapse of the intervening chambers due to the higher pressure in the alternate chambers. Means comprising a series of passages are provided in each alternate frame for admitting gas under pressure into the alternate chambers and a similar series of passages are also provided in the alternate frames for withdrawing a portion of the gaseous mixture from the alternate chambers. Intervening frames are provided with passages for collecting the gases permeating through the membranes into the intervening chambers.

Preferably the entire membrane supporting unit is disposed within a vessel which is supplied with the gaseous mixture to be separated under superatmospheric pressure. The passages in the frames leading to alternate chambers are open to the vessel allowing the gaseous mixture in the vessel to flow at superatmospheric pressure into the alternate chambers.

In order that the invention may be better understood, reference is now made to the accompanying drawings which show several embodiments of the invention, and in which Figure 1 is a side elevation of a pressure vessel partially cut away to show a membrane-supporting unit disposed therein;

Figure 1:
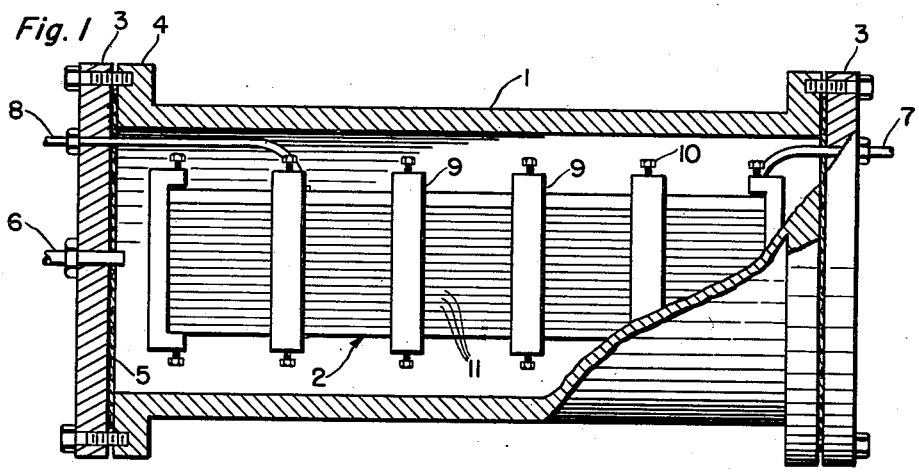

Referring now to Figure 1, the reference numeral 1 refers to a cylindrical vessel constructed to contain a gas under superatmospheric pressure. The numeral 2 generally refers to a membrane-supporting unit disposed within the vessel 1. The opposite ends of vessel 1 are closed by end-plates 3 bolted to flanges 4. Gaskets 5 are provided to assure a gas-tight seal between plates 3 and flanges 4. An inlet 6 is provided at one end of the vessel to admit gaseous mixtures under superatmospheric pressure.

The membrane-supporting unit 2 is provided with passages which are open to the vessel for allowing the gases present in the vessel to flow into alternate chambers provided within the membrane supporting unit, as will be seen more clearly from the subsequent description. A portion of the gases entering the alternate chambers are withdrawn therefrom and conducted out of the vessel by outlet 7. The gases permeating through the membranes into intervening chambers in membrane-supporting unit 2 are withdrawn therefrom by means of outlet 8.

Figure 2:
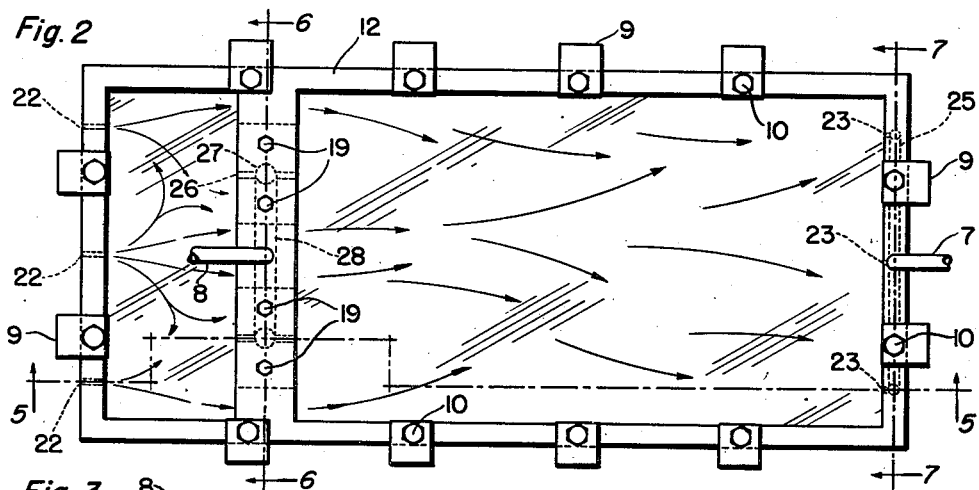
Figure 2 is a plan view of a membrane-supporting unit constructed according to the preferred embodiment of the invention.
Figure 3:
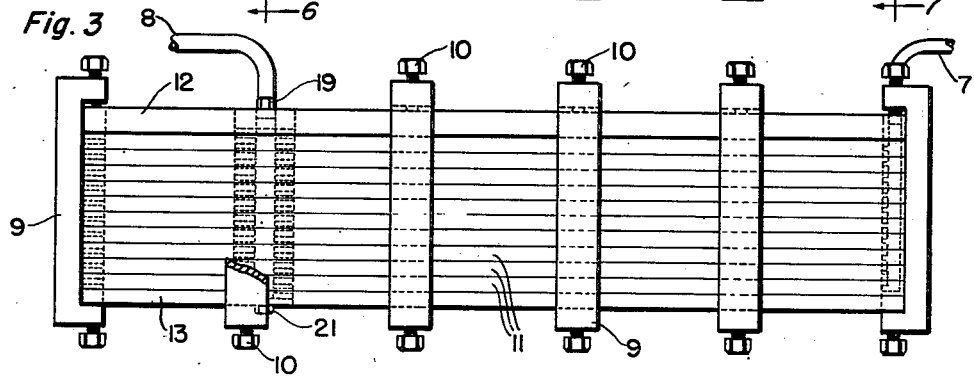
Figure 3 is a side elevation of the membrane-supporting unit shown in Figure 2.

Referring now to Figures 2 and 3 showing a plan view and a side elevation respectively of the preferred embodiment of the invention, the numeral 9 refers to a series of clamps provided with set screws 10. Between the jaws of clamps 9 are disposed a plurality of identical rectangular frames 11 disposed in face-to-face relationship. These frames are clamped together between upper and lower clamping plates 12 and 13, respectively, and are securely held in place by tightening set screws 10.

Figure 4:
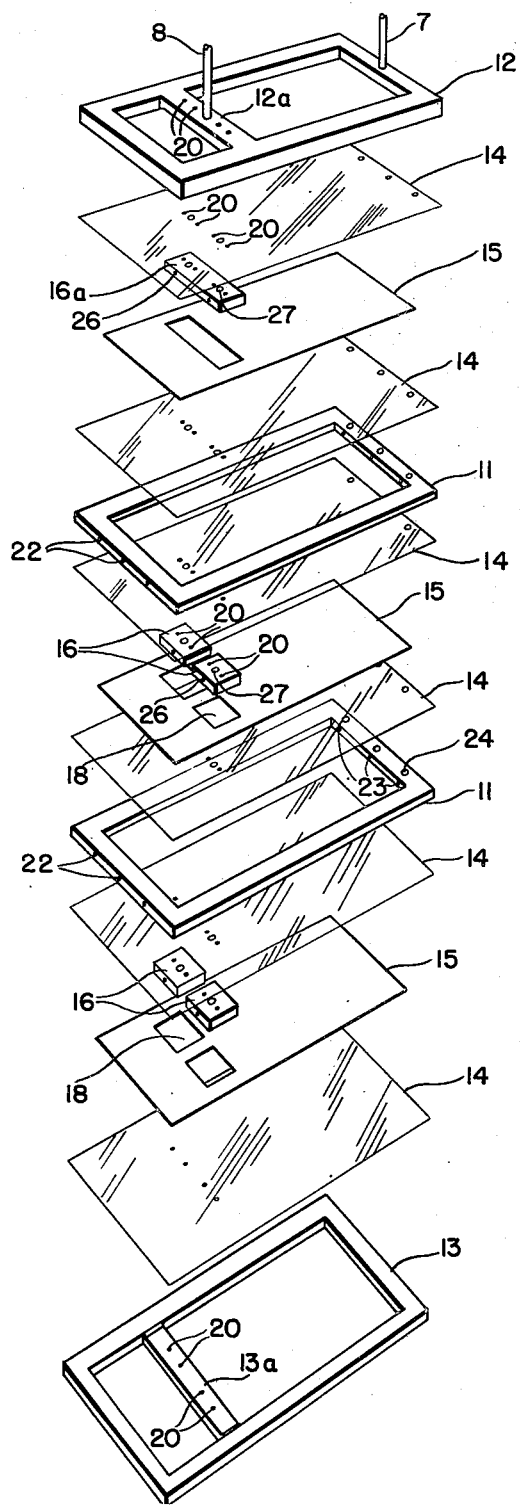
Figure 4 is an exploded perspective view of a membrane-supporting unit constructed according to the preferred embodiment of the invention.
Figure 5:
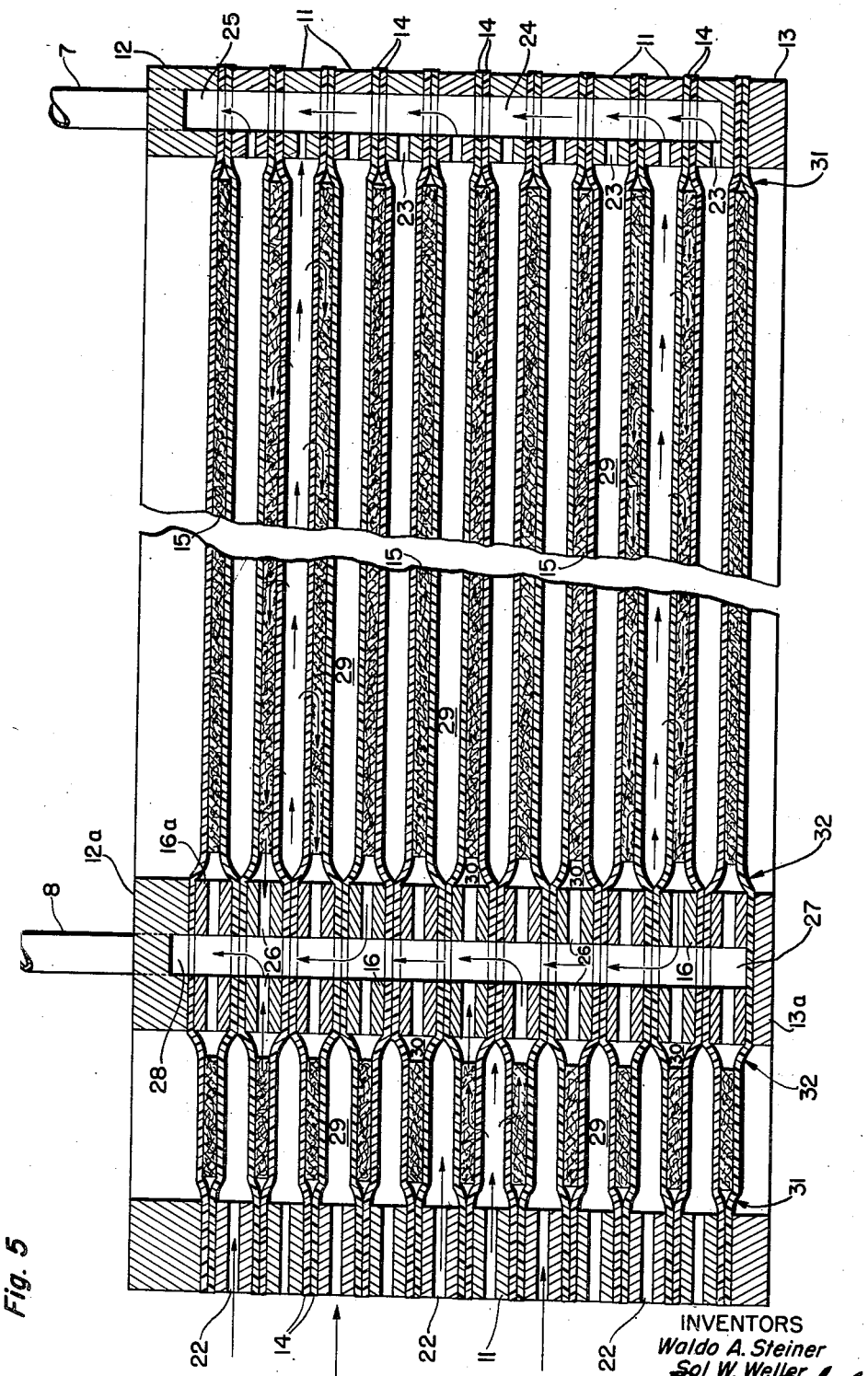
Figure 5 is a sectional view taken on line 5—5 of Figure 2.

Reference is now made to Figures 4 and 5. In Figure 4, between upper and lower clamping plates 12 and 13, respectively, there are shown only two rectangular frames 11, but it is to be understood that any number of frames may be used. In practice, preferably several hundred or several thousand will be employed in a single unit. Between each pair of adjacent frames, and between the uppermost frames and the upper clamping plate 12, and between the lowermost frame and lower clamping plate 13, there is disposed a pair of thin, non-porous membranes 14. As can be seen clearly in Figure 5, membranes 14 are substantially the same size as frames 11 so that when the unit is assembled, the peripheral portions of a pair of membranes are clamped between each pair of adjacent frames.

Between each pair of membranes whose peripheral portions are sealed together in contact with one another when the unit is assembled (see Figure 5), there is disposed a porous sheet 15. Porous sheets 15 are so constructed as to permit the passage of gases therethrough in directions parallel to their surface, as will be explained more in detail subsequently.

Figure 6:
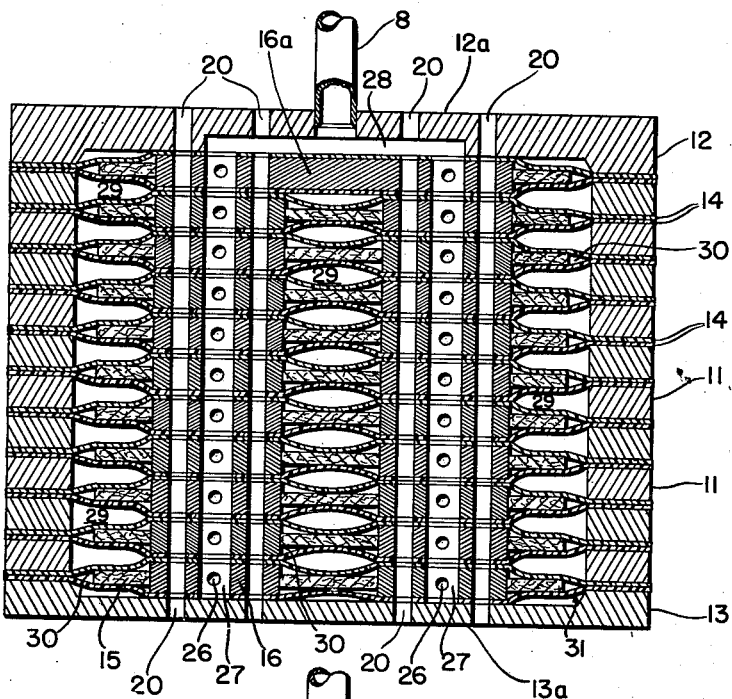
Figure 6 is a section taken on line 6—6 of Figure 2.

Disposed within the periphery of frames 11 are a plurality of collectors 16. Collectors 16 are each composed of two blocks with the exception of the uppermost collector 16a which consists of a single block. The collectors are disposed in aligned, face-to-face relationship and are clamped between ribs 12a and 13a of clamping plates 12 and 13, respectively. A pair of collector blocks is disposed between each of those pairs of membranes whose peripheral portions are sealed in contact with another when the unit is assembled, and thus it is apparent that the collectors are disposed between the same pairs of membranes between which porous sheets 15 are disposed. In the assembled unit, the collectors fit within cut-out portions 18 of porous sheets 15 and are sealed in face-to-face contact against the membranes between which they are disposed. It will be noted that each pair of adjacent collectors clamps together a portion of a pair of membranes whose peripheral portions are separated from one another by one of the frames 11 (see Figure 5). The collectors are held securely in place by means of bolts 19 (see Figures 2 and 3) passing through holes 20 provided in upper clamping plate 12, membranes 14, collectors 16 and 16a, and lower clamping plate 13. Nuts 21 (see Figure 3) threading onto the lower portion of bolts 19, hold the collector assembly in place. In Figure 6, for clarity of illustration, bolts 19 and nuts 21 have not been shown.

Figure 8:
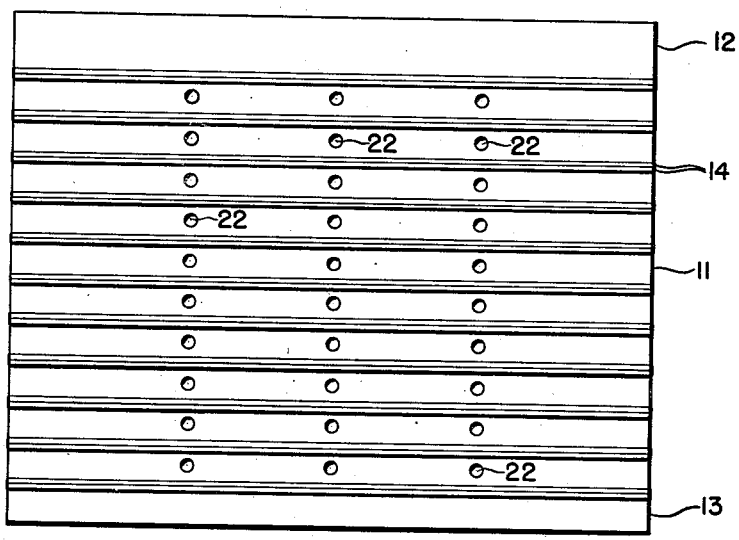
Figure 8 is an elevation of the left end of the membrane-supporting unit shown in Figure 2.

Referring now particularly to Figures 2, 5, and 8, the numeral 22 refers to passages provided in one end of each of the frames 11. As can be seen in Figure 2 and in Figure 8 (an elevation of the left end of Figure 2) three passages are provided in each frame, although any desired number may be provided to assure an even distribution of gas within the membrane-supporting unit. The passages 22 are inlet passages for admitting a gaseous mixture into the membrane-supporting unit.

Figure 7:
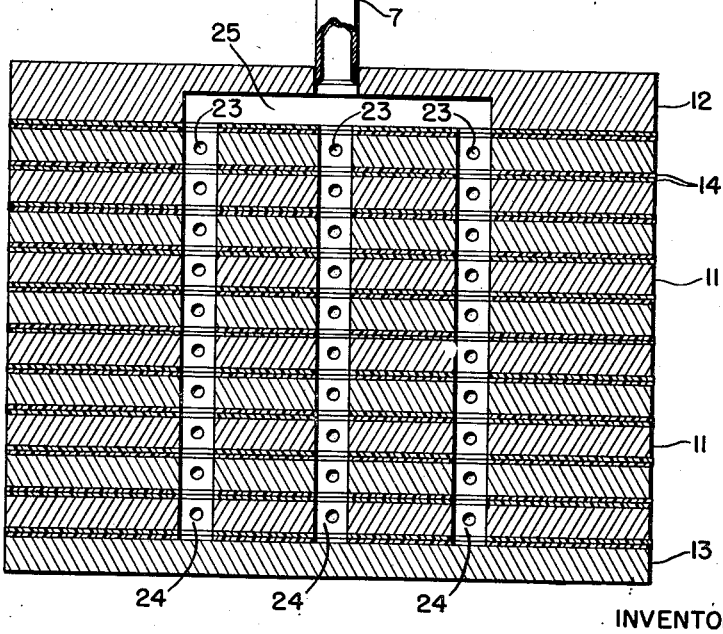
Figure 7 is a section taken on line 7—7 of Figure 2.

Referring now particularly to Figures 2, 5, and 7, the numeral 23 refers to lateral passages provided in each of the frames 11 at the opposite end thereof from passages 22. As can be seen clearly in Figures 2 and 7, three lateral passages 23 are provided in each of the frames 11, although any desired number may be provided. Opening through frames 11, vertically disposed common passages 24 are provided, communicating with lateral passages 23. Each of the vertically disposed passages 24 open into horizontally disposed channel 25 provided in upper clamping plate 12. By means of passages 23 and 24, and channel 25, a portion of the gaseous mixture admitted into the unit through passages 22 is withdrawn from the unit through conduit 7, as will be explained more in detail subsequently.

Directing attention now to the collector blocks and referring to Figures 2, 5, and 6, the numeral 26 refers to lateral passages provided in collectors 16 and 16a. Each collector block is provided with one such lateral passage, as may be seen particularly by reference to Figures 4 and 6. The uppermost collector 16a consisting of one long block has two lateral passages 26, one at either end. Opening through the collectors, common passages 27 are provided, vertically disposed, and communicating with lateral passages 26. The passages 27 open into a horizontal channel 28 provided in rib 12a of clamping plate 12 as can be seen best in Figure 6. The passages 26 and 27 and channel 28 provide means for withdrawing gases which have permeated through the membranes as will be more apparent from the subsequent description. Permeated gases are withdrawn from channel 28 by means of conduit 8.

By reference to Figures 5 and 6, it can be seen that the frames 11 and membranes 14 conjointly provide a series of narrow, side-by-side chambers. Alternate chambers 29 of this series receive high pressure gas through inlet passages 22. As can be seen, the alternate chambers 29 are defined by pairs of membranes whose peripheral portions are separated by one of the frames 11. The intervening chambers 30, on the other hand, are defined by pairs of membranes the peripheral portions of which are sealed together between a pair of adjacent frames 11. It will be noted that a porous sheet 15 and a pair of collector blocks are disposed between each pair of membranes defining an intervening chamber 30. The intervening chambers 30 are maintained under a lower pressure than the pressure existing in the alternate chambers 29, so that a pressure differential exists on the opposite sides of each membrane. By reference to Figures 5 and 6, it will be noted that by virtue of this pressure differential, the membranes defining opposite walls of alternate chambers 29 are forced apart and urged into intimate face-to-face contact with porous sheets 15 disposed in the intervening chambers 30.

Porous sheets 15 are substantially coextensive with the membrane area within the inner boundaries of frames 11, with the exception of the portions 18 which are cut away to accommodate collectors 16 and 16a. It will be seen that sheets 15 are not clamped between frames 11 or the collectors 16, and are preferably supported only by the membranes defining opposite walls of intervening chambers 30. The sheets 15 support the low pressure side of the thin, fragile membranes 14 over substantially their entire area so that even with a high pressure differential, for example 30 atms., existing between the alternate chambers 29 and the intervening chambers 30 there will be no tendency for the membranes to rupture.

The sheets 15 must be generally flat and porous enough to allow gases to percolate into and within the sheet in substantially all directions, including directions parallel to their surface. Preferably, the sheets 15 are homogeneously porous over their entire surfaces and throughout their thickness. This is important because gases permeating through the membranes 14 from alternate chambers 29 come into immediate contact with sheet 15 and it is important that the sheets 15 be receptive to the permeated gases over their entire area and permit the permeated gases to percolate within the sheet so that the gases might be withdrawn therefrom. While some irregularities may be tolerated, it is preferable that the surfaces of the sheets 15 be generally flat and that the pores in the surface of the sheets be relatively small so that no appreciable area of membrane is left unsupported. In general, the higher the pressure differential the flatter must be the sheets 15, and the smaller the average pore diameter in order to provide proper support for the membranes.

Any generally flat porous sheet constructed of any desired material which is adapted to permit the percolation of gases into and within the sheet and particularly in directions parallel to its surface will be suitable for use in the process and apparatus in the invention. However, a generally flat sheet of relatively loosely matted fibrous material is particularly suitable. Sheets of fibrous material similar to a sheet of blotting paper are inexpensive, provide excellent support for the membranes, and are homogeneously porous over their entire surfaces and throughout their entire thickness so as to allow the percolation of gases therethrough in all directions. Furthermore such fibrous sheets have a low density and require no further support than that provided by the relatively fragile membranes between which they are disposed.

As previously explained, the rate of permeation of a gaseous mixture through a solid membrane, even a very thin membrane, is quite slow. Thus, the rate of permeation of gases through the membranes into the intervening chambers 30 is slow and consequently the size of the pores in porous sheets 15 is not critical as far as requiring a fast rate of percolation of the permeated gases therethrough. Throughout the entire unit, the rate of flow will generally be of such an order of magnitude as to be laminar rather than turbulent, and will be characterized by a Reynolds' number in the range of from 0.01 to 100.

In Figures 5, 6, and 7, the thickness of frames 11, collectors 16, membranes 14, and porous sheets 15 has been purposely exaggerated for clarity of illustration. Preferably, frames 11 and collectors 16 are of the minimum thickness inorder to save material and to effect the disposition of the maximum membrane area in the minimum volume. Ordinarily there is no reason why the thickness of frames 11 and collectors 16 should exceed one quarter of an inch and preferably the thickness is less than one quarter of an inch, and may be one-eighth of an inch or even smaller. It is not necessary that the lateral passages 22 and 23 in the frames 11 or the lateral passages 26 in the collector 16 be of a large diameter since as pointed out, the rates of flow of gas through the permeation unit is quite slow.

The membranes 14 should be as thin as possible to permit the maximum overall rate of permeation. Preferably, the membranes should be of a thickness in the range of from about 0.0001 to 0.005 inch. In general, films having a thickness less than 0.0001 inch are too fragile for practical purposes. When the thickness of the membrane exceeds 0.005 inch, the absolute or overall rate of permeation becomes quite slow and uneconomical.

The porous sheets 15 must obviously have a thickness less than the thickness of the frames 11 and collectors 16. They should be thick enough to allow the free percolation of permeated gases within the sheet. It will be noted that each pair of membranes defining the low pressure intervening chambers 30 must open up, as at 31, to receive the peripheral edge of porous sheets 15. It will also be noted that the membranes defining the intervening chambers 30 must also open up further, as at 32, to receive the collector blocks 16. While for clarity, the opening up of the membranes to receive the sheets 15 and collector blocks 16 has been purposely exaggerated. it will be apparent that at points 31 and 32 there will be small areas of unsupported membrane which will have a tendency to rupture as the pressure increases. Preferably to porous sheets 15 will have a thickness in the order of one-half the thickness of the frames 11 and collectors 16 (frames 11 and collectors 16 are of the same thickness). In this way, one-half of the necessary opening up of the membranes will occur at points 31 and one-half will occur at points 32. Suitable measures, not indicated in the drawings, may be taken to round the edges of the collectors 16 to minimize the danger of rupturing the membranes at points 32 where they open up to receive the collectors.

In the assembled units, clamps 9 compress the frames 11 and the peripheral portions of membranes 14 between upper and lower clamping plates 12 and 13, respectively. The bolts 19 align the collector blocks 16 and help to clamp them between ribs 12a and 13a. In the assembly, membranes 14 serve as gaskets to seal off the alternate chambers from the intervening chambers and to prevent the escape of gases from vertical passages 24 and 27. If desired, additional means besides clamping force may be used to assure a gas tight seal where the membranes are sealed between the frames and the collectors. Thus, any suitable cement may be used, or the membrane surfaces at the appropriate areas may be coated with a liquid which is a partial solvent or plasticiser for the material of which the membranes are composed, so that when the unit is assembled, the membranes will be solvent-welded to one another and to the frames 11 and collectors 16. Alternatively, after assemblage, the frames 11 and collectors 16, when of metallic construction, may be heated to cause thermo-welding of the membranes.

The operation of the preferred embodiment of the invention as shown in Figures 1 to 7, inclusive, will now be described. Referring particularly to Figure 1, a gaseous mixture, for example, a mixtuure of hydrogen and methane, is introduced into vessel 1 under a pressure, for example, of 15 atm. through the conduit 6. As can be seen most clearly in Figures 2 and 5, the gaseous mixture under superatmospheric pressure in vessel 1 enters the membrane-supporting unit through lateral passages 22 which are open to the vessel. The gaseous mixture flowing in through passages 22 enters alternate chamber 29. As previously pointed out, since the gas in the alternate chambers 29 is at a higher pressure than the gas in intervening chambers 30, the membranes defining opposite walls of the alternate chambers are forced apart from one another and urged into face-to-face contact with porous sheets 15 disposed in intervening chambers 30. This can be seen most clearly in Figures 5 and 6. The gaseous mixture in alternate chambers 29 flows towards the opposite end of the membrane-supporting unit. It will be noted that collectors 16 partially block off alternate chambers 29, but it can be seen (see Figures 2, 4, and 6) that the collectors do not extend completely across the unit, space being provided between the collectors and on either side thereof to allow the incoming gases entering alternate chambers 29 through passages 22 to flow to the opposite end of the unit. A portion of the gaseous mixture flowing in alternate chambers 29 is allowed to permeate through the membranes into intervening chambers 30. In the case of a mixture of hydrogen and methane, using membranes composed of polystyrene, hydrogen would permeate through the polystyrene membranes twenty times faster than the methane. Thus, the gases permeating into intervening chambers 30 would be enriched in hydrogen. The portion of the high pressure gas flowing in alternate chambers 29 which does not permeate through the membranes is withdrawn through passages 23, common passages 24, channel 25, and conduit 7.

The gases which have permeated through the membranes into intervening chambers 30 immediately enter porous sheets 15. The porous sheets 15, as previously explained, are constructed so as to have the ability to conduct gas in directions parallel to their surface, and are preferably composed of relatively loosely matted fibrous material. The permeated gases percolate through the porous sheets 15 towards the collectors and are withdrawn from intervening chambers 30 by means of lateral passages 26, passages 27, channel 28, and are withdrawn from the unit by means of conduit 8. It will be noted that the intervening chambers 30 and the outlet means for the permeated gases, comprising collectors 16 and conduit 8, are entirely closed to the high pressure gaseous mixture in vessel 1. Thus, the only manner in which the high pressure gaseous mixture in vessel 1 may enter the intervening chambers 30 is by permeation through membranes 14.

It will be noted that the outlet for the low pressure permeated gases is shown disposed at the same end of the unit as the inlet for the high pressure gaseous mixture to be separated, thus providing, for the most part, countercurrent flow of the gases in the alternate chambers 29 and intervening chambers 30. This arrangement is preferable since by virtue of this arrangement conditions are most favorable for a high rate of permeation along the entire length of the unit.

The membrane-supporting unit may be of any desired shape, but in order to effectively maintain the counter-current flow of gases in alternate chambers 29 and intervening chambers 30, the membrane-supporting units are preferably rectangular in shape with the gases flowing in directions parallel to the longer sides of the unit.

The rate of flow of the high pressure gases in alternate chambers 29 will, of course, determine what fraction of gas permeates into the intervening chambers. The higher the rate of flow of the gases in alternate chambers 29, the smaller the fraction of gas which will permeate through the membranes into the intervening chambers 30. The fraction of gas permeating will determine the degree of separation which may be obtained in one stage of permeation with a given gas mixture, using a given membrane. The lower the fraction which is allowed to permeate, the higher will be the degree of separation; but to offset this seeming advantage, the smaller the fraction which is allowed to permeate, the greater the fraction which must be withdrawn from the unit as high pressure non-permeated gas, and this high pressure gas must either be decompressed (in which case only a portion of its compressional energy can be recovered as useful energy) or must be recycled to another stage for further permeation. The optimum rate of flow of a gaseous mixture to be separated through the alternate chambers 29 will depend upon balancing the cost of compressing additional gas and the cost of additional permeation stages.

As previously pointed out, the alternate chambers 29 are preferably supplied with gas at superatmospheric pressure, most conveniently by disposing the unit shown in Figures 2 to 7 in a pressure vessel supplied with the gaseous mixture at superatmospheric pressure. The intervening chambers are maintained at a lower pressure, most conveniently atmospheric. It is preferred to operate with high pressures on the pressure side of the membranes at least about 4 and as high as 30 atmospheres. If desired, however, the pressure vessel 1 can be dispensed with, and the gaseous mixture at atmospheric pressure admitted through passages 22 into the alternate chambers 29, while the intervening chambers are maintained at a subatmospheric pressure by a vacuum pumping through conduit 8 for withdrawing low-pressure permeated gas from the unit.

The change in composition that may be obtained by permeation of a given gaseous mixture depends, among other things, upon the type of membrane employed, the fraction of gas which is allowed to permeate, and the ratio of pressures on opposite sides of the membranes. If one stage of permeation is not sufficient to obtain a mixture of the desired composition, it is necessary to arrange additional stages of permeation. In this case, any desired number of separate pressure vessels containing membrane-supporting units are arranged in series and the permeated gas from the first of this series is recompressed and fed as high-pressure feed gas into the next pressure vessel of the series where it undergoes a second stage of permeation. The low pressure permeated gas from this second stage is then recompressed and fed into the next vessel of the series, and so on until a gas of the desired composition is obtained. It is clear that any number of membrane-supporting units, contained in one or more pressure vessels, and connected in parallel, may be used in each permeation stage. Of course, at least one unit connected in series with the units preceding and/or succeeding it, is necessary in every permeation stage. The most desirable method for conducting a gas permeation process in stages is described in U. S. Patent 2,540,151, issued February 6, 1951, to Sol Weller and Waldo A. Steiner for "The Separation of Oxygen From Gas Mixtures Containing the Same," on application Serial No. 132,346, filed December 10, 1949, and in U. S. Patent 2,540,152, issued February 6, 1951, to Sol Weller for "Recovery of Light Elemental Gases," on application Serial No. 132,347, filed December 10, 1949.

The choice of membrane will depend upon the particular gaseous mixture to be separated. As pointed out in the above mentioned copending applications the choice of a particular membrane for a particular gaseous mixture will depend upon the selectivity of the membrane towards the component it is desired to recover and to the overall permeability of the membrane. For the recovery of oxygen from atmospheric air, rubber membranes may be employed. However, as described in the first of the above mentioned copending applications, "Separation of Oxygen from Gas Mixtures Containing the Same," ethyl cellulose or cellulose propionate membranes are superior to rubber membranes for the recovery of oxygen from the atmosphere. For the recovery of hydrogen and helium from industrial gas mixtures in which they most often occur, the use of polystyrene or ethyl cellulose membranes have been found to be highly satisfactory, as described in the second of the above mentioned copending applications "Recovery of Light Elemental Gases." However, the process and apparatus described in this application is not limited to any particular type of membrane, but may be employed for the separation of any given mixture of gases using any desired membrane which is selectively permeable to one of the the components of the gaseous mixture.

Figure 9:
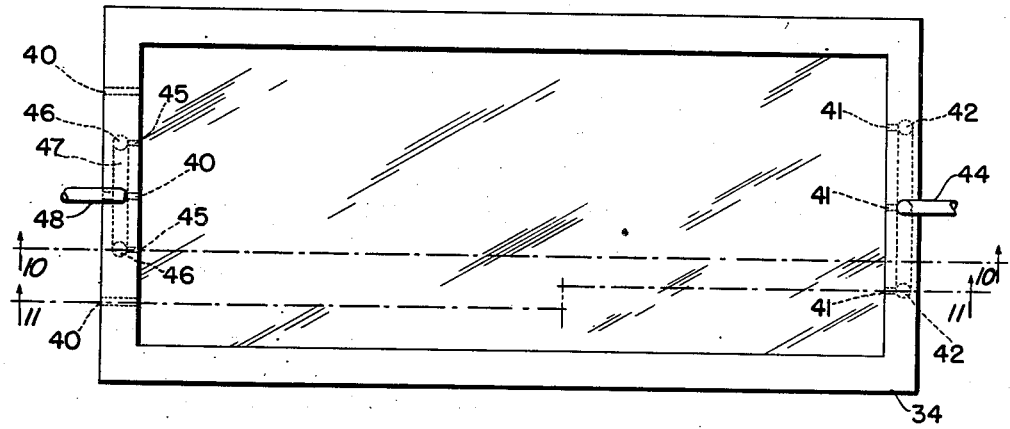
Figure 9 is a plan view of a membrane-supporting unit constructed in accordance with another embodiment of the invention.
Figure 10:
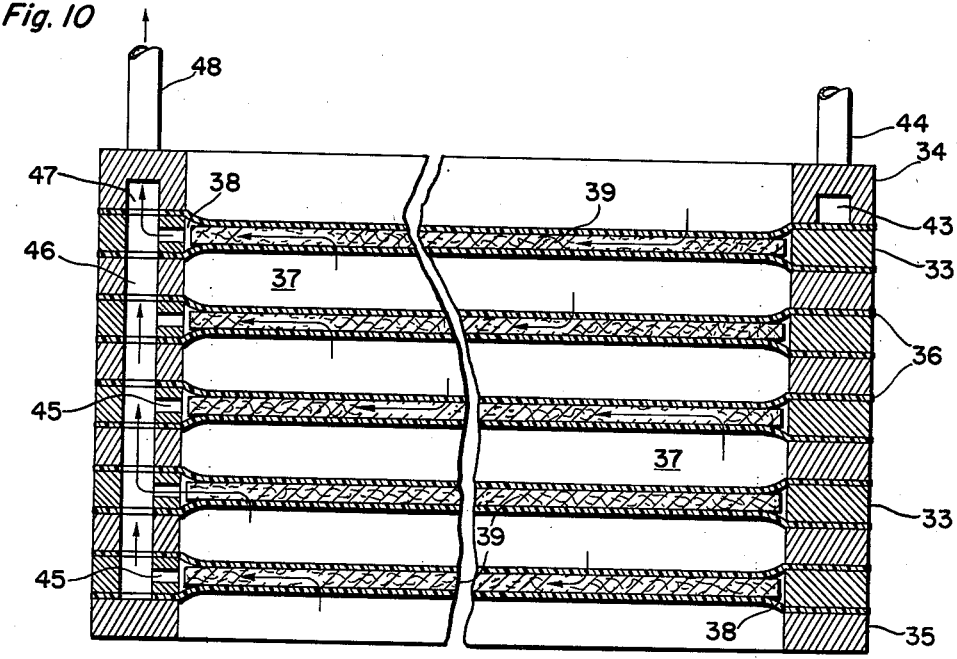
Figure 10 is a section taken on line 10—10 of Figure 9.
Figure 11:
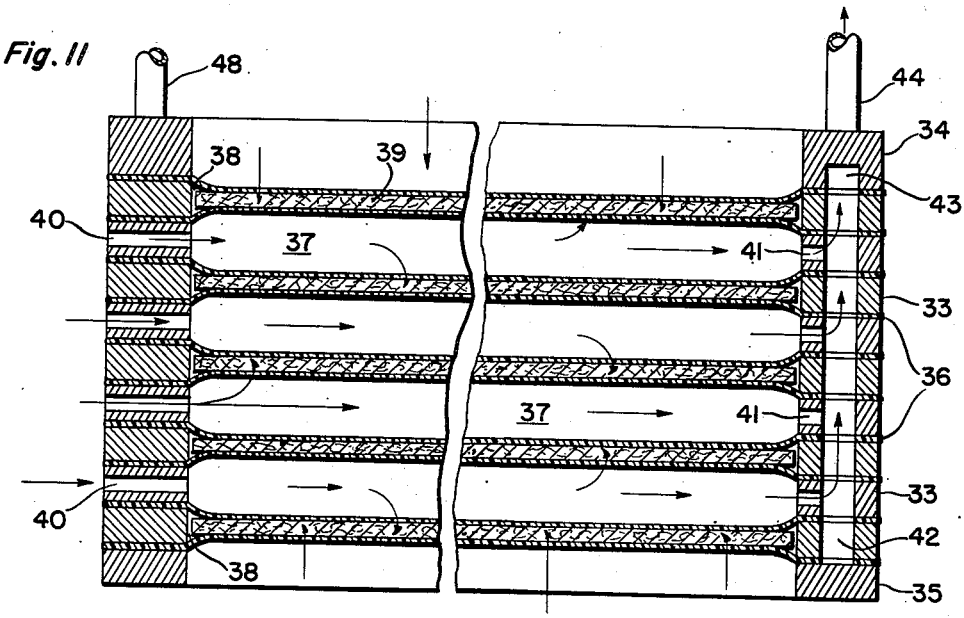
Figure 11 is a section taken on line 11—11 of Figure 9.

Reference is now made to Figures 9, 10, and 11, showing another embodiment of the invention. While this embodiment requires more materials and a greater volume to support the same membrane area as does the unit comprising the preferred embodiment of the invention, it has many of the desirable features of the preferred embodiment.

The membrane-supporting unit comprising this second embodiment of the invention is comprised of a plurality of rectangular frames 33, generally similar to frames 11, disposed in face-to-face relationship and clamped between upper clamping plate 34 and lower clamping plate 35. Between each pair of adjacent frames and between the upper clamping plate 34 and the uppermost frame, and between the lower clamping plate 35 and the lowermost frame there is disposed a single thin, non-porous membrane 36, having the desired properties of selective permeability. The membranes and frames conjointly provide a series of chambers comprising alternate chambers 37 and intervening chambers 38. Porous sheets 39, similar to sheets 15 are disposed between the membranes defining each intervening chamber.

Referring now particularly to Figures 9 and 11, reference numeral 40 refers to lateral passages provided in each alternate frame, lateral passages 40 communicating with alternate chambers 37 and being adapted to admit a gaseous mixture into alternate chambers 37. As may be seen by reference to Figure 9, three lateral passages 40 are provided in each alternate frame, but it is to be understood that any desired number of such passages may be provided.

A portion of the high pressure gas passing through alternate chambers 37 in the direction indicated by the arrows (see Figure 11) is withdrawn from the alternate chambers by means of lateral passages 41 provided in the alternate frames at the opposite end of the unit. Three lateral passages 41 are shown disposed at each alternate frame. Opening through the frames, there are provided vertically disposed common passages 42 communicating with lateral passage 41. The common passages 42 open into horizontal channel 43 provided in upper clamping plate 34. Gases in channel 43 are withdrawn therefrom by means of conduit 44.

Referring now particularly to Figures 9 and 10, the reference numeral 45 refers to lateral passages provided in intervening frames and opening into intervening chambers 38 for withdrawing permeated gases from intervening chambers 38. By reference to Figure 9, it may be seen that two such lateral passages 45 are provided in each intervening frame, although any desired number may be provided. Opening through the frames 33 there are provided vertically disposed common passages 46 which communicate with lateral passages 45. Vertical passages 46 open into horizontal channel 47 provided in upper clamping plate 34. Conduit 48 conducts away the low-pressure permeated gases from channel 47.

The operation of the embodiment shown in Figures 9 to 11 is much the same as the operation of the device shown in Figures 2 to 8. In this embodiment, the entire membrane-supporting unit is preferably disposed in a pressure-containing vessel similar to vessel 1 (Figure 1). The gaseous mixture which it is desired to separate is continuously admitted under superatmospheric pressure into the vessel and flows into the membrane-supporting unit through lateral passages 40 into alternate chambers 37. A portion of the gas flowing in alternate chambers 37 is continuously withdrawn therefrom at the opposite end of the unit through lateral passages 41, passages 42, channel 43, and conduit 44, and thus is withdrawn from the unit and from the pressure vessel. The high pressure gas in the alternate chambers 37 forces the membranes defining opposite walls of the alternate chambers 37 apart from one another and urges the membranes into face-to-face contact with porous sheets 39. The gas permeating through the membranes immediately enters the porous sheets 39 and percolates therethrough towards lateral passages 45 (see Figure 10) and is withdrawn from the unit through common passages 46, channel 47, and conduit 48.

As in the preferred embodiment of the invention, it will be noted that the outlet for the permeated gas is disposed at the same end of the unit as the inlet for the high pressure gas, so that countercurrent flow of the gases in the alternate chambers 37 and intervening chambers 38 is established. It will also be noted that in this embodiment, as in the preferred embodiment, the shape of the unit is preferably rectangular with the gas flowing parallel to the longer sides.

In this embodiment, instead of collecting the permeated gases from the intervening chambers by means of collectors disposed within the periphery of the frames, every other frame serves as a collector for the gases in the intervening chambers. While this arrangement is somewhat simpler in construction than the preferred embodiment of the invention, it has the disadvantage of requiring substantially twice the amount of materials and twice the volume to support the same membrane area, and consequently the unit comprising the preferred embodiment of the invention is by far the most economical unit.

It is to be understood that the above description and drawings are for the purpose of illustrating the invention and it is not intended that the invention be limited thereby nor in any way except by the scope of the appended claims. Other variations and modifications than those suggested specifically above are intended to be included within the scope of the invention.

We claim:

1. Apparatus for the separation of gases by fractional permeation of gaseous mixtures through non-porous membranes comprising a series of adjacent chambers disposed in side-by-side relationship, said chambers being defined conjointly by a plurality of thin, non-porous membranes disposed in side-by-side parallel planes and by a plurality of frames sealing the peripheral portions of said chambers, said thin, non-porous membranes having a selective permeability with respect to at least one of the gases to be separated, alternate chambers of said series being inlet chambers for receiving the gas mixture to be separated, and the intervening chambers being outlet chambers for receiving the gas permeating through said membranes, means for supplying the gas mixture to be separated under a predetermined pressure to said inlet chambers, means for withdrawing a portion of said gas mixture from said inlet chambers, said inlet chambers being maintained at a substantially higher pressure than said outlet chambers, whereby the membranes defining the walls of said outlet chambers tend to be urged toward, and into contact with one another, means for supporting and separating the membrane walls of said outlet chambers comprising a porous sheet disposed between said membrane walls and making face-to-face contact therewith, said porous sheet being so constructed as to permit the percolation of gases into and within itself in substantially all directions, and means for withdrawing from said outlet chambers gases permeating through said membranes from said inlet chambers.

2. Apparatus for the separation of gases by fractional permeation of gaseous mixtures through non-porous membranes comprising a series of adjacent chambers disposed in side-by-side relationship, said chambers being defined conjointly by a plurality of thin, non-porous membranes disposed in side-by-side parallel planes and by a plurality of frames sealing the peripheral portions of said chambers, said non-porous membranes having a selective permeability with respect to at least one of the gases to be separated, alternate chambers of said series being inlet chambers for receiving the gas mixture to be separated, and the intervening chambers being outlet chambers for receiving the gases permeating through said membranes, said inlet chambers being maintained at a substantially higher pressure than said outlet chambers, whereby the membranes defining the walls of said outlet chambers tend to be urged toward, and into contact with one another, means for supporting and separating the membrane walls of said outlet chambers comprising a porous, relatively thin, fibrous sheet disposed between said membrane walls and making face-to-face contact therewith, said fibrous sheet being substantially coextensive with, and entirely carried and supported by, the membrane walls of said outlet chambers, means for supplying the gas mixture to be separated under a predetermined pressure to said inlet chambers, means for withdrawing a portion of said gas mixture from said inlet chambers, and means for withdrawing from said outlet chambers gases permeating through said membranes from said inlet chambers.

3. Apparatus for the separation of gases by fractional permeation of gaseous mixtures through non-porous membranes comprising a series of adjacent chambers disposed in side-by-side relationship and separated from one another by thin, non-porous membranes having a selective permeability with respect to at least one of the gases to be separated, alternate chambers of said series being inlet chambers for receiving the gas mixture to be separated, and the intervening chambers being outlet chambers for receiving the gas permeating through said membranes, said inlet chambers being maintained at a substantially higher pressure than said outlet chambers, whereby the membranes defining the walls of said outlet chambers tend to be urged toward, and into contact with one another, means for supporting the membrane walls of said outlet chambers comprising a porous sheet disposed between said membrane walls and making face-to-face contact therewith, said porous sheet being so constructed as to permit the percolation of gases into and within itself in substantially all directions, means for supplying the gas mixture to be separated under a predetermined pressure to said inlet chambers, means for withdrawing a portion of said gaseous mixture from said inlet chambers, and means for withdrawing from said outlet chambers gases permeating through said membranes from said inlet chambers.

4. Apparatus for the separation of gases by fractional permeation of gaseous mixtures through non-porous membranes comprising a plurality of frames disposed in face-to-face relationship, the peripheral portions of a pair of thin, non-porous membranes having a selective permeability with respect to at least one of the gases to be separated being disposed between each pair of adjacent frames, thereby defining a series of side-by-side adjacent chambers, alternate chambers of said series being inlet chambers for receiving the gas mixture to be separated, and the intervening chambers being outlet chambers for receiving the gases permeating through said membranes, each of said inlet chambers being defined by a pair of membranes the peripheral portions of which are separated by one of said frames, and each of said outlet chambers being defined by a pair of membranes the peripheral portions of which are sealed together by a pair of adjacent frames, said inlet chambers being maintained at a substantially higher pressure than said outlet chambers whereby the membranes defining the walls of said outlet chambers tend to be urged towards, and into contact with one another, means for supporting and separating the membrane walls of said outlet chambers comprising a porous sheet disposed between said membrane walls and making face-to-face contact therewith, said porous sheet being so constructed as to permit the percolation of gases into and within itself in substantially all directions, means for admitting the gas mixture to be separated under a predetermined pressure to said inlet chambers, means for withdrawing a portion of said gas mixture from said inlet chambers, and means for withdrawing from said outlet chambers gases permeating through said membranes from said inlet chambers.

5. Apparatus according to claim 4 wherein said porous sheet is comprised of fibrous material.

6. Apparatus for the separation of gases by fractional permeation of gaseous mixtures through non-porous membranes comprising a plurality of frames disposed in face-to-face relationship, the peripheral portions of a pair of thin, non-porous membranes having a selective permeability with respect to at least one of the gases to be separated being disposed between each pair of adjacent frames, thereby defining a series of side-by-side adjacent chambers, alternate chambers of said series being inlet chambers for receiving the gas mixture to be separated, and the intervening chambers being outlet chambers for receiving the gases permeating through said membranes, each of said inlet chambers being defined by a pair of membranes the peripheral portions of which are separated by one of said frames, and each of said outlet chambers being defined by a pair of membranes the peripheral portions of which are sealed together by a pair of adjacent frames, said inlet chambers being maintained at a substantially higher pressure than said outlet chambers whereby the membranes defining the walls of said outlet chambers tend to be urged toward, and into contact with one an other, means for supporting and separating the membrane walls of said outlet chambers comprising a porous sheet disposed between said membrane walls and making face-to-face contact therewith, said porous sheet being so constructed as to permit the percolation of gases into and within itself in substantially all directions, separate passages in said frames for admitting the gas mixture to be separated into said inlet chambers, a second series of separate passages in said frames at the opposite end thereof for withdrawing a portion of said gaseous mixture from said inlet chambers, a common passage opening through said frames and communicating with said second series of passages, means for withdrawing from said outlet chambers gases permeating through said membranes from said inlet chambers, said last-mentioned means comprising a plurality of collectors disposed within the periphery of said frames in aligned, face-to-face relationship, one of said collectors being disposed in each of said outlet chambers, each of said collectors being provided with separate passages for withdrawing permeated gas from said outlet chambers, and said collectors being conjointly provided with a common passage communicating with said separate passages for withdrawing said permeated gas from said separate passages.

7. Apparatus for the separation of gases by fractional permeation of gaseous mixtures through non-porous membranes comprising a plurality of frames disposed in face-to-face relationship, the peripheral portions of a thin, non-porous membrane having a selective permeability with respect to at least one of the gases to be separated being disposed between each pair of adjacent frames, thereby defining a series of adjacent, side-by-side chambers, each chamber of said series being defined by a pair of membranes the peripheral portions of which are separated by one of said frames, alternate chambers of said series being inlet chambers for receiving the gas mixture to be separated, and the intervening chambers being outlet chambers for receiving the gases permeating through said membranes, said inlet chambers being maintained at a substantially higher pressure than said outlet chambers whereby the membranes defining the walls of said outlet chambers tend to be urged toward, and into contact with one another, means for supporting and separating the membrane walls of said outlet chambers comprising a porous sheet disposed between said membrane walls making face-to-face contact on opposite sides therewith, said porous sheet being so constructed as to permit the percolation of gases into and within itself in substantially all directions, inlet passages provided in alternate frames for admitting the gas mixture to be separated to said inlet chambers, outlet passages provided in said alternate frames for withdrawing a portion of said gaseous mixture from said inlet chambers, and outlet means provided in intervening frames for withdrawing from said outlet chambers gases permeating through said membranes from said inlet chambers.

8. Apparatus according to claim 7 wherein said porous sheet is comprised of fibrous material.

9. Apparatus for the separation of gases by fractional permeation of gaseous mixtures through non-porous membranes comprising a vessel adapted to contain gases under superatmospheric pressure, means for supplying said vessel with a gaseous mixture under superatmospheric pressure, a removable gas permeation unit disposed within said vessel, said unit comprising a series of adjacent chambers arranged in side-by-side relationship and separated from one another by thin, non-porous membranes having a selective permeability with respect to at least one of the gases to be separated, alternate chambers of said series being inlet chambers for receiving the gas mixture to be separated and the intervening chambers being outlet chambers for receiving the gases permeating through said membranes, said inlet chambers being provided with passages open to said vessel for admitting the gas mixture to be separated into said inlet chambers, conduit means communicating with said inlet chambers but closed to said vessel for withdrawing a portion of said gaseous mixture from said inlet chambers, and means closed to said vessel for withdrawing from said outlet chambers gases permeating through said membranes from said inlet chambers.

10. Apparatus for the separation of gases by fractional permeation of gaseous mixtures through non-porous membranes comprising a vessel adapted to contain gases under superatmospheric pressure, means for supplying said vessel with a gaseous mixture under superatmospheric pressure, a removable gas permeation unit disposed within said vessel, said unit comprising a series of adjacent chambers arranged in side-by-side relationship and separated from one another by thin, non-porous membranes having a selective permeability with respect to at least one of the gases to be separated, alternate chambers of said series being inlet chambers for receiving the gas mixture to be separated, and the intervening chambers being outlet chambers for receiving the gases permeating through said membranes, said inlet chambers being provided with passages open to said vessel for admitting the gas mixture to be separated into said inlet chambers, conduit means communicating with said inlet chambers, but closed to said vessel, for withdrawing a portion of said gas mixture from said inlet chambers, said inlet chambers being maintained under a substantially higher pressure than said outlet chambers whereby the membranes defining the walls of said outlet chambers tend to be urged towards and into contact with one another, means for supporting and separating the membrane walls of said outlet chambers comprising a porous sheet disposed between said membrane walls and making face-to-face contact on opposite sides therewith, said porous sheet being so constructed as to permit the percolation of gases into and within itself in substantially all directions, and means closed to said vessel for withdrawing from said outlet chambers gases permeating through said membranes from said inlet chambers.

WALDO A. STEINER.
SOL W. WELLER.

REFERENCES CITED

The following references are of record in the file of this patent:

UNITED STATES PATENTS

| Number | Name | Date |
|---|---|---|
| 736,745 | Kubin | Aug. 18, 1903 |
| 1,966,034 | Hensler | July 10, 1934 |
| 2,159,434 | Frey | May 23, 1939 |
| 2,494,554 | Harlow | Jan. 17, 1950 |

FOREIGN PATENTS

| Number | Country | Date |
|---|---|---|
| 22,340 | Great Britain | Dec. 21, 1891 |